United States Patent [19]
Guerrera

[11] Patent Number: 5,923,152
[45] Date of Patent: Jul. 13, 1999

[54] POWER FACTOR CORRECTION CIRCUIT WITH SOFT SWITCHED BOOST CONVERTER

[75] Inventor: Nunzio Guerrera, St. Leonard, Canada

[73] Assignee: Astec International Limited, The Hong Kong Special Administrative Region of the People's Republic of China

[21] Appl. No.: 08/803,464

[22] Filed: Feb. 20, 1997

[51] Int. Cl.⁶ .................................................. G05F 1/10
[52] U.S. Cl. .......................... 323/222; 363/26; 363/127
[58] Field of Search ............................. 363/16, 24, 25, 363/26, 89, 127; 323/222, 224, 225

[56] References Cited

U.S. PATENT DOCUMENTS

| | | | |
|---|---|---|---|
| 4,716,514 | 12/1987 | Patel | 363/127 |
| 5,146,396 | 9/1992 | Eng et al. | 363/16 |
| 5,260,607 | 11/1993 | Kinbara | 307/253 |
| 5,408,403 | 4/1995 | Nerone et al. | 363/37 |
| 5,515,261 | 5/1996 | Bogdan | 363/89 |
| 5,550,458 | 8/1996 | Farrington et al. | 323/222 |
| 5,563,487 | 10/1996 | Davis | 318/254 |
| 5,646,832 | 7/1997 | Pulhamus, Jr. et al. | 363/24 |
| 5,657,212 | 8/1997 | Poon et al. | 363/17 |
| 5,668,703 | 9/1997 | Rossi et al. | 363/13 |
| 5,712,536 | 1/1998 | Haas et al. | 323/222 |

*Primary Examiner*—Edward H. Tso
*Assistant Examiner*—Derek J. Jardieu
*Attorney, Agent, or Firm*—Coudert Brothers

[57] ABSTRACT

A boost converter for a power factor correction circuit having application in a DC power supply for telecommunication equipment. The boost converter has a pair of independently controlled switches such as MOSFET in series with an inductor. A capacitor is in parallel with each switch and the lossless resonant discharge of the capacitors by energy stored in the inductor eliminates switch losses at turn on. As a result the converter may be operated at higher frequencies, thereby reducing the size and cost of magnetic components in the power supply.

18 Claims, 5 Drawing Sheets

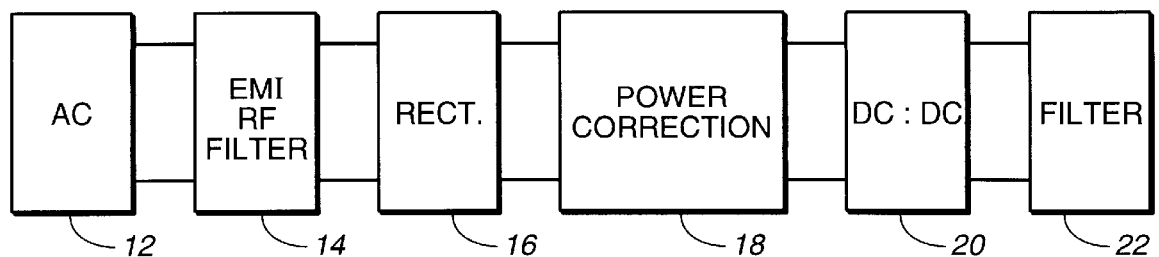
FIG._1
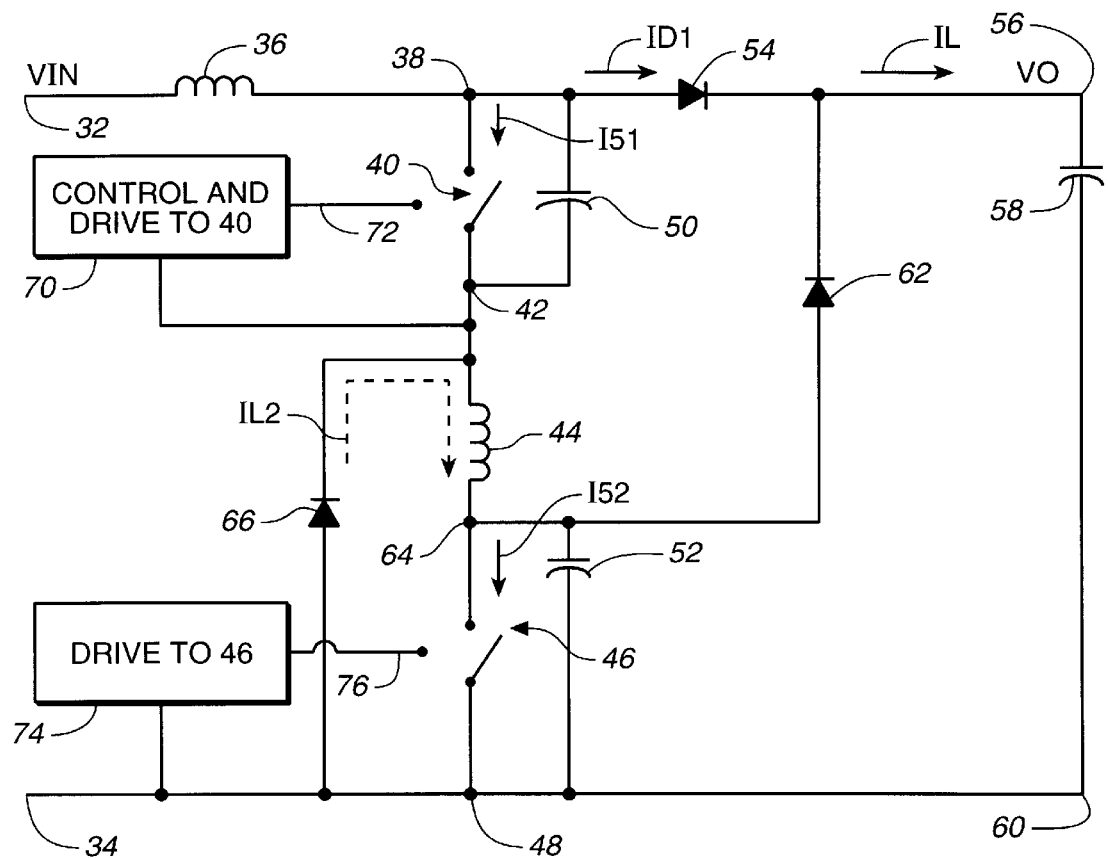
FIG._2

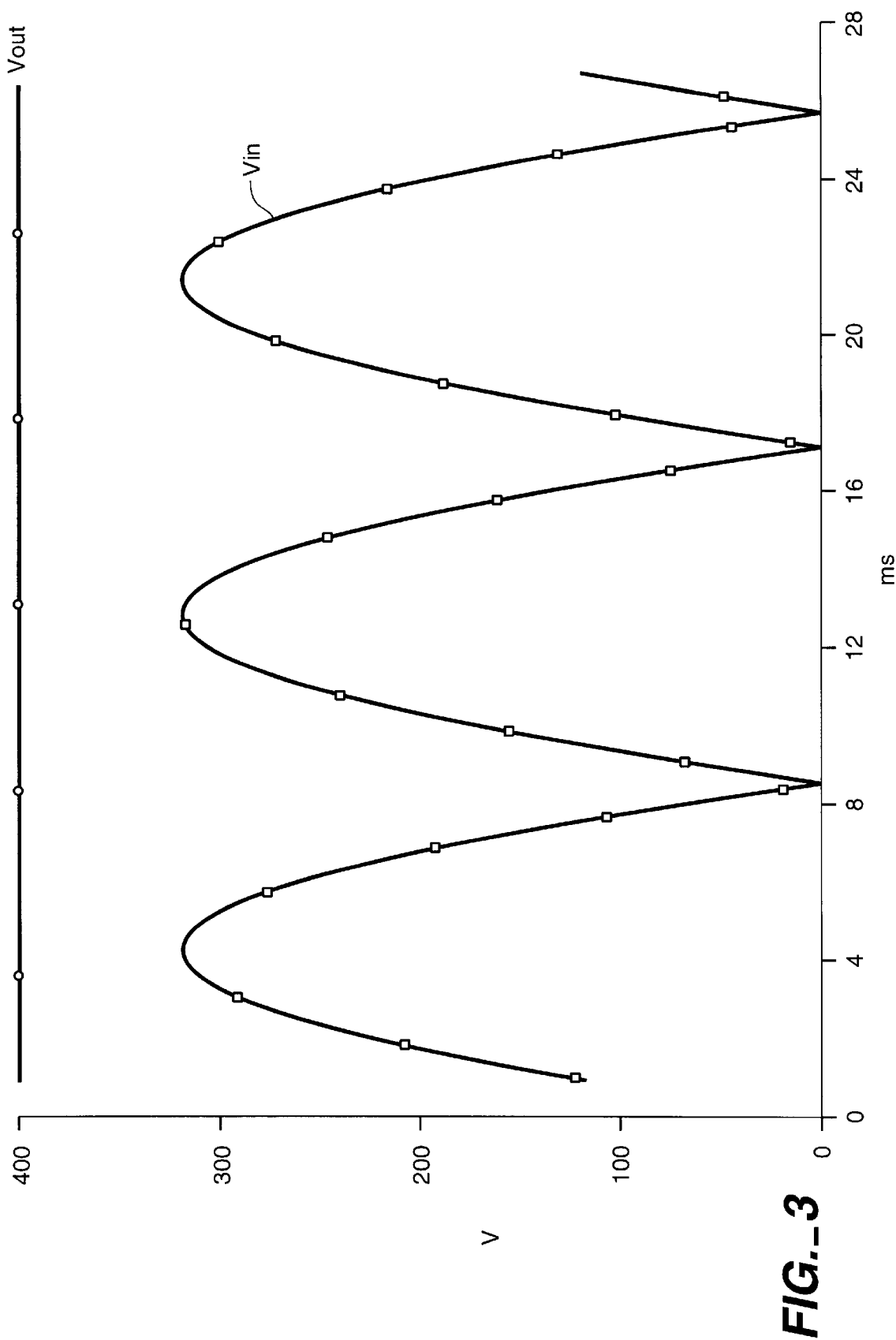
FIG._3

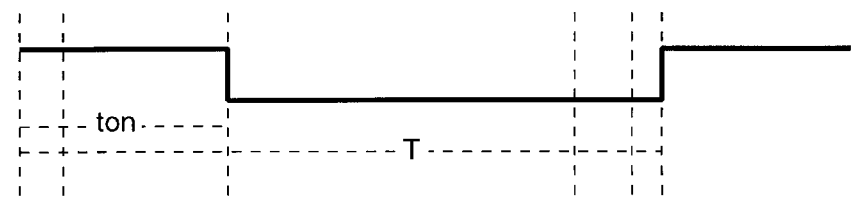
FIG._4A
FIG._4B
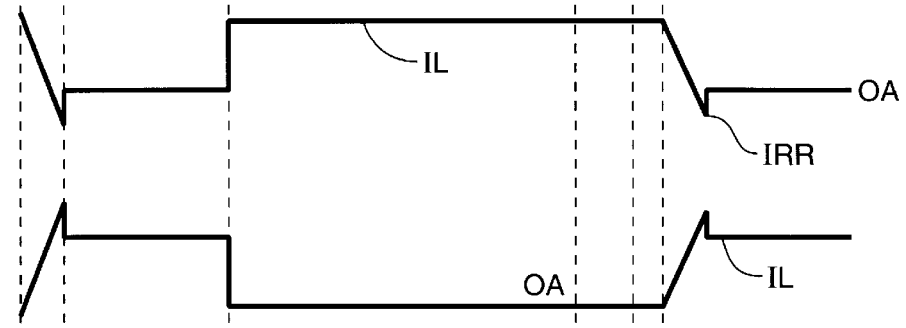
FIG._4C
FIG._4D
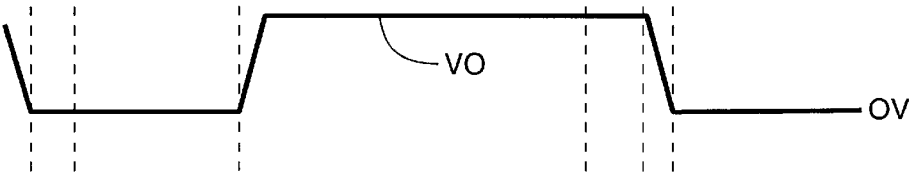
FIG._4E
FIG._4F
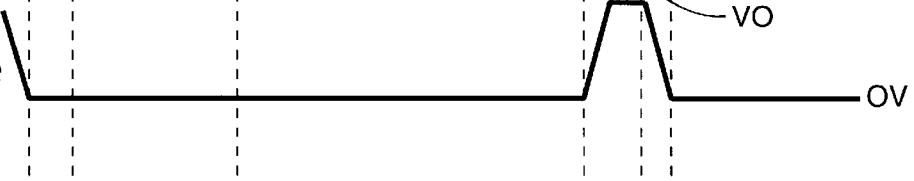
FIG._4G
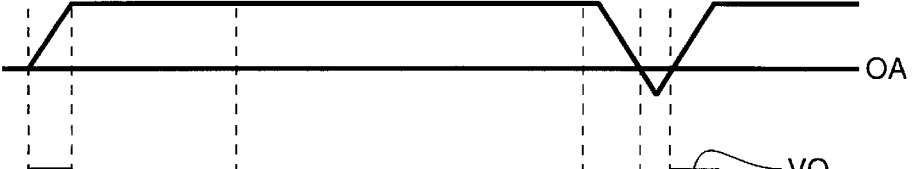
FIG._4H
FIG._4I
VOLTAGE
ACROSS
INDUCTOR 44

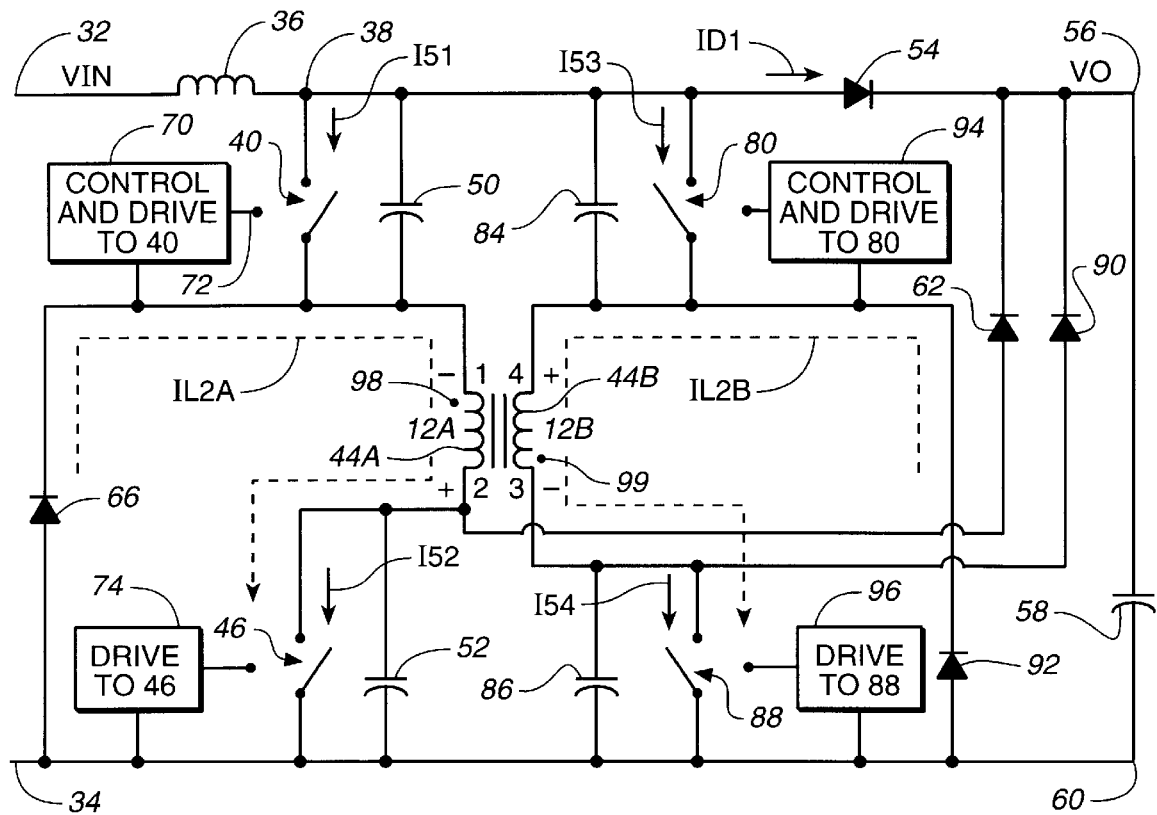
FIG._5
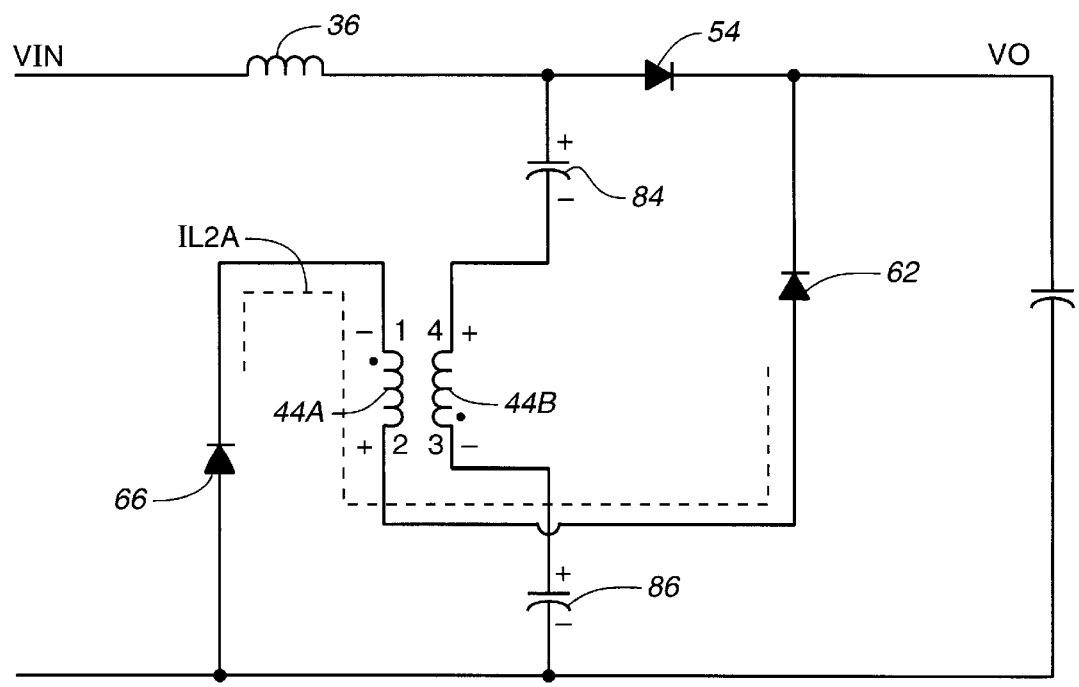
FIG._7

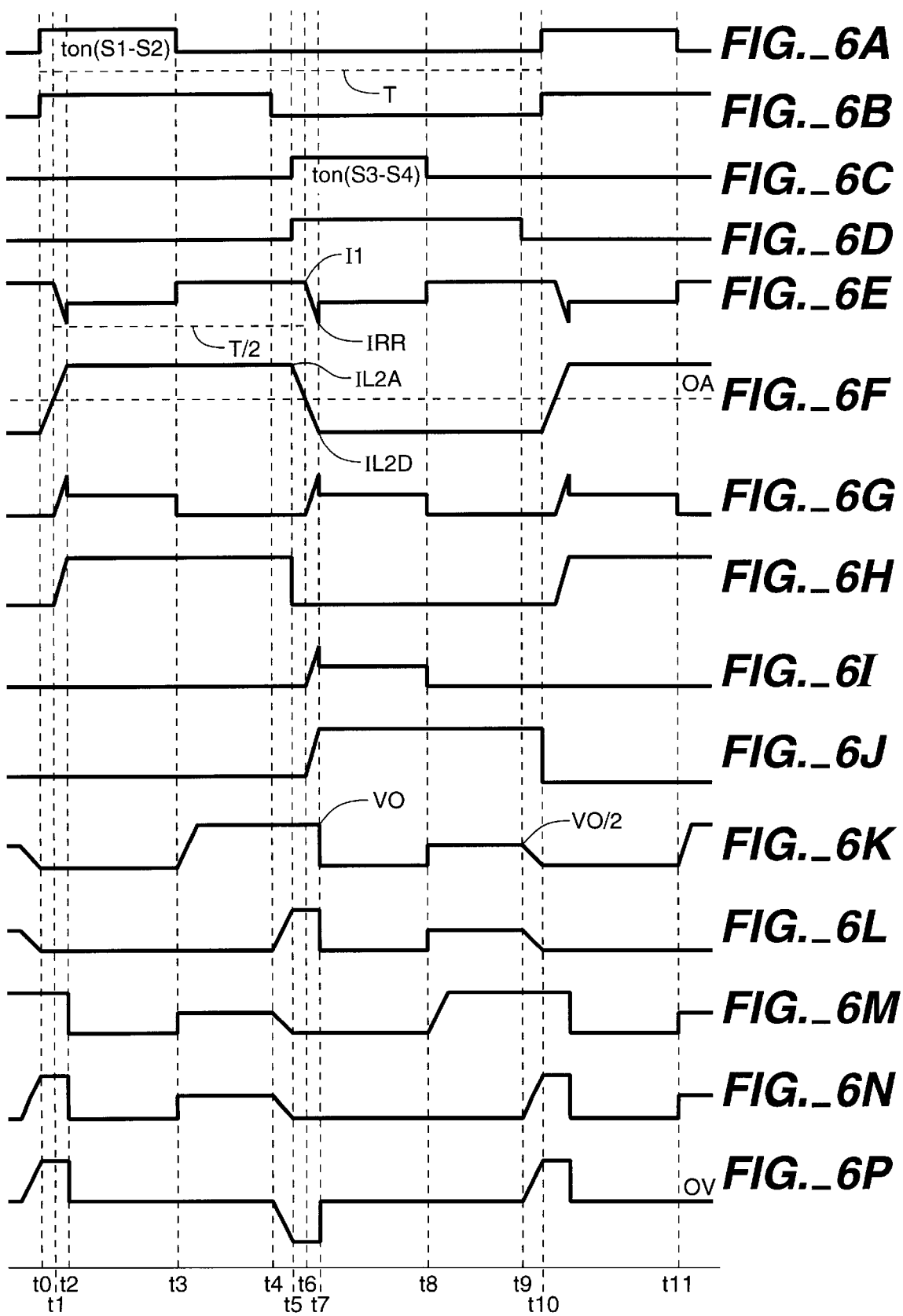

5,923,152

POWER FACTOR CORRECTION CIRCUIT WITH SOFT SWITCHED BOOST CONVERTER

FIELD OF INVENTION

This invention relates to DC power suppliers for such applications as telecommunication equipment and, more particularly, to power supplies having a soft switched boost converter for a power factor correction circuit operable at high frequencies.

BACKGROUND OF THE INVENTION

Power supplies for telecommunications equipment such as wireless base stations, etc., are required to deliver a regulated DC voltage such as 48 volts. These power supplies are powered by the AC line voltage, which voltage is rectified by known means such as a bridge rectifier. Power factor correction circuits are frequently used in power supplies of this type as is known. A power factor correction circuit causes the average current drawn from the AC input supply to be approximately in phase with the input voltage and to be a sinusoidal wave. This results in a more efficient operation with power factors approaching 0.99 being achievable.

One implementation of a power factor control circuit employs a boost converter comprising an inductor, a capacitor, and a controllable switch. The switch, such as a MOSFET, is controlled by a pulse width modulated (PWM) signal. The inductor and capacitor operate with the switch to alternatively store and discharge energy. One example of a power factor correction circuitry with a boost converter is described in U.S. Pat. No. 5,515,261 which issued May 7, 1996 to Bogdan. Other examples of boost converter circuits may be found in U.S. Pat. No. 5,550,458 which issued Aug. 27, 1996 to Farrington et. al. and U.S. Pat. No. 5,408,403 which issued Apr. 18, 1995. A circuit employing a snubber to minimize switching losses is described in U.S. Pat. No. 5,260,607 which issued Nov. 9, 1993 to Kinbara.

SUMMARY OF THE INVENTION

It is an object of the present invention to provide a power factor correction circuit having a boost converter which operates at higher frequencies than known power factor correction circuits.

It is also an object of the present invention to provide a boost converter having smaller magnetic components than previously required.

The objects of the present invention are achieved through the use of a boost converter circuit having a pair of independently controllable electronic switches in combination with an inductance means and a pair of shunt capacitors.

Therefore, in accordance with a first aspect of the present invention, there is provided a boost converter for a power factor correction circuit, the boost converter comprising input means to receive a rectified AC signal, a first controllable switch, an inductor and a second controllable switch serially connected across the input means, a first capacitor in parallel with the first switch, a second capacitor in parallel with the second switch, a first diode in parallel with the first switch and inductor, a second diode in parallel with the inductor and the second switch, output means and a third diode between the first switch and the output.

In a second aspect of the invention the boost converter also has a third controllable switch, a second inductor and a fourth controllable switch serially connected across the input means, a third capacitor across the third switch, a fourth capacitor across the fourth switch, a fourth diode across the third switch and second inductor, and a fifth diode across the second inductor and the fourth switch.

BRIEF DESCRIPTION OF THE DRAWINGS

The invention will now be described in greater detail with reference to the attached drawings wherein:

FIG. 1 is a block diagram of the power supply;

FIG. 2 is a schematic diagram of the power factor correction circuit including a boost converter;

FIG. 3 shows input and output voltage waveforms for the circuit of FIG. 2.

FIG. 4 shows voltage and current waveforms at various points in the circuit of FIG. 2;

FIG. 5 is a schematic diagram of a second embodiment of the present invention;

FIG. 6 shows voltage and current waveforms at various points in the circuit of FIG. 5; and FIG. 7 is an enlarged schematic of the inductor circuit of FIG. 5.

DETAILED DESCRIPTION OF THE INVENTION

FIG. 1 shows in block form the elements of a power supply including a power factor correction circuit as contemplated by the present invention. The supply receives input power from the AC mains 12. This AC signal goes through an EMI and RF filter 14, a full wave rectifier 16, the power correction circuit 18 of the present invention, a DC to DC converter 20 and an output filter 22.

The power factor correction circuit including a boost converter according to a first embodiment of the present invention is shown in FIG. 2. As shown, a rectified AC signal is supplied to the circuit at input terminals 32,34. A boost inductor 36 is connected between the input 32 and node 38. Also connected to node 38 is a first switch 40, the other side of which is connected to node 42 which in turn is connected to inductor 44. The other side of inductor 44 is connected to second switch 46. The other side of switch 46 is connected to input terminal 34 via node 48. Capacitor 50 is connected in parallel with switch 40 and capacitor 52 is connected in parallel with switch 46. Additionally, diode 54 is connected between node 38 and output terminal 56. Capacitor 58 is across output terminal 56 and terminal 60. Diode 62 is connected between the cathode of diode 54 and node 64 which is between inductor 44 and second switch 46. Diode 66 is connected across inductor 44 and second switch 46.

Switches 40,46 in a preferred embodiment are MOSFETs having source, drain and gate terminals. As is well known, current flow between the drain and source is controlled by the input to the gate. Thus, in FIG. 2, the signal from controller 70 on line 72 represents the gate signal to switch 40. Similarly the signal from controller 74 on line 76 represents the gate signal to switch 46.

FIG. 3 illustrates the rectified AC voltage which is supplied to the input terminals 32 and 34. The boosted DC output voltage is also shown. Although FIG. 3 refers to the embodiment of FIG. 2 it is to be understood that the waveforms also apply to the embodiment illustrated in FIG. 5 to be discussed later.

In operation of the circuit of FIG. 2, the output voltage $V_O$ is regulated by modulating the on-time of switch 40 with respect to a constant switching period T. The maximum duty cycle of switch 40 is determined by the maximum on-time of switch 46. The objectives and advantages of the present invention are achieved through the interaction of switches 40 and 46, inductor 44 and diodes 62 and 66. This particular arrangement results in reduced turn-on and turn-off losses of switches 40 and 46 and also minimizes the reverse recovery current of diode 54. This arrangement also results in the lossless resonant discharge of capacitors 50 and 52 by the energy stored in inductor 44 at turn-off of switch 46. This permits switches 40 and 46 to turn on at a time when the voltage to the switches is zero thereby eliminating the $\frac{1}{2}CV^2$ losses in switches 40 and 46 at turn-on. As a result of these features the boost converter can be operated at much higher frequencies than the prior art boost converters. The boost converter of the present invention can operate at 400 kHz while prior art circuits operate in the range 50 kHz to 100 kHz. As a result of this higher frequency operation circuit components involving magnetic elements throughout the power supply are reduced in size which in turn results in smaller packaging and reduced costs.

The operation of the circuit will now be described with reference to FIGS. 2, 3 and 4, using time $t_0$ in FIG. 4 as a first point of reference. Prior to $t_0$, diode 54 is conducting and switch 40 and 46 are open. Hence all of the load current flows through diode 54. At $t_0$ both switch 40 and switch 46 are turned on as indicated in the waveform diagrams shown in FIGS. 4A and 4B. When the switches are turned on a voltage equal to $V_O$ is applied across inductor 44, and at the same time the load current is switched from diode 54 to the switches 40 and 46 and inductor 44. The slow rise time of the current through switches 40 and 46, as shown in the waveforms of FIGS. 4D and 4F, reduces the turn-on losses of the switches and reduces the reverse recovery current in diode 54 as shown in FIG. 4C. Reduction of the recovery current is instrumental in reducing the frequency dependent losses in diode 54.

At time $t_1$, diode 54 has completed its recovery period and effectively becomes an open circuit. At the same time current in inductor 44 has reached its maximum value and can no longer change. Thus, the voltage across inductor 44 collapses to zero volts and the load current flows in switch 40, switch 46 and inductor 44 as previously discussed.

At time $t_2$ switch 40 is turned off thereby causing the load current to flow into and charge capacitor 50 until it is clamped to $V_O$ by diode 66 (FIG. 4E). At this time the load current is carried again by diode 54 as shown in FIG. 4F.

At time $t_3$ switch 46 is also turned off as shown in FIG. 4B and the stored energy in inductor 44 is diverted to the charging of capacitor 52 until it is clamped to $V_O$ by diode 62. This energy transfer to capacitor 52 reduces turn-off losses in switch 46 as shown in FIG. 4G. From time $t_3$ to time $t_4$ a reverse voltage is applied across inductor 44 causing the current in inductor 44 to decrease toward zero as shown in FIG. 4H. At time $t_4$ the energy previously stored in inductor 44 has reached zero and the inductor is reset. At time $t_4$ an LC resonant circuit is formed between capacitor 50, capacitor 52, and inductor 44, discharging the capacitors from $V_O$ to zero volts. This is shown in the interval between time $t_4$ and time $t_5$. At time $t_5$ the process begins over with the waveforms of FIG. 4A and FIG. 4B applied to switches 40 and 46 respectively. The resonant discharge of capacitor 50 and 52 has transferred the stored energy to the load so that it did not have to be dissipated in switches 40 and 46 at turn-on.

A second embodiment of the boost converter of the invention is shown schematically in FIG. 5. Components in FIG. 5, which are the same as those shown in FIG. 2, have been given the same reference numerals. It is to be noted that inductor 44 in this circuit is one inductor, not two and that it has two windings, A and B, magnetically coupled on one core. To simplify the following description the inductors are identified as 44A and 44B.

In the embodiment shown in FIG. 5, the output voltage $V_O$ is regulated by modulating the on-time of switch 40 and switch 80 with respect to a constant time period T. The object of this embodiment is again to increase the boost converter operating frequency in order to reduce converter size while maintaining high efficiency by adding turn-on snubber inductor 44A,44B and turn-off snubber capacitors 50,52,84 and 86 across switches 40,46,80 and 88 respectively. The arrangement of switch 40,48,80 and 88 and inductors 44A and 44B reduces the turn-on and turn-off losses of the switches and minimizes the reverse recovery current of diode 54. A major advantage of the arrangement is in the lossless resonant discharge of capacitors 50,52,84 and 86 by the energy stored in inductor 82 at turn-off of switches 46 and 88. This permits the four switches to turn on when the voltage across each of the switches is zero, thus eliminating the $\frac{1}{2}CV$ losses in the switches at turn-on. As a result, the boost converter can be operated at much higher frequencies than the conventional boost converters. As indicated previously, the size or volume of the boost inductor 36, as well as the magnetic components in the EMI filter, are frequency dependent. Thus, the higher the switching frequency the smaller the magnetic components need be. This reduces size of the overall power supply and reduces component costs. Further, because of the full bridge nature of the switch arrangement, the switches operate at a frequency f, while the boost inductor and EMI filter magnetics are designed for a switching frequency 2f. This also leads to smaller inductance values. Because of the soft switched nature of the boost converter of FIG. 5, the EMI emissions are reduced, which further reduces EMI filter component size and count.

As shown in FIG. 5, diode 90 is across switch 80 and inductor 82 while diode 92 is across switch 88 and inductor 82. Switch 40 has controller 70 to provide a pulse width modulated signal to its input. Similarly switch 46 is controlled by controller 74, switch 80 is controlled by controller 94, and switch 88 is controlled by controller 96. FIGS. 6A to 6D show the waveforms for each controller 70,74,94 and 96 respectively. These waveforms are supplied to the gate inputs of each of the MOSFETs which constitute the switches in a preferred embodiment.

Operation of this embodiment will now be described with reference to FIGS. 5 and 6. At time $t_0$, switches 40 and 46 are provided with an 'on' signal from controllers 70,74 respectively. At time $t_0$, diode 54 is conducting current and $V_{in}$ appears at $v_0$. When switches 40 and 46 turn on, however, a voltage is applied across inductor 44A and current that had been flowing in inductor 44B (from a previous cycle) starts to decrease. At time $t_1$, current in inductor 44B has reached zero. As previously described at time $t_1$, current previously flowing through diode 54 is switched to the path comprising switch 40, inductor 44A and switch 46. Because of the polarity, current is flowing into end 98 of inductor 44A. The current rise time is given by $V_O$ divided by the inductance L of inductor 44B.

At time $t_2$, diode 54 has finished its recovery period and is effectively an open circuit. At the same time the current through inductor 44A has reached its maximum value and can no longer charge. Thus, the voltage across inductor 44A collapses to zero volts as shown in FIG. 6P. At the same time current flows through switches 40 and 46 and inductor 44A while no current is flowing through inductor 44B as switches 80 and 88 are turned off.

At time $t_3$, switch 40 turns off and the current is again transferred through diode 54, as shown in FIG. 6E. Switch 46 is still on, maintaining a constant current in inductor 44A. At the time switch 40 turns off, the current it was conducting is transferred to capacitor 50, thereby charging capacitor 50 until it is clamped to $V_0$ by diode 66. The transfer of current to capacitor 50 reduces turn-off losses of switch 40 as shown in FIG. 6K. At time $t_3$, the voltage across inductor 44A is zero. Because inductor 44A and inductor 44B are magnetically coupled as shown by the solid lines between the inductors in FIG. 5, the voltage across inductor 44B is also zero. Since switches 80 and 88 are in series with inductor 44B, the voltage across each of the switches 80 and 88 is $V_0/2$ as shown in FIGS. 6M and 6N respectively.

At time $t_4$, switch 46 turns off. The current previously flowing through switch 46 is transformed to capacitor 52, thereby charging capacitor 52 until it is clamped to $v_0$ by diode 62. The transfer of current to capacitor 52 reduces the turn-off losses of switch 46. At turn off of switch 46 a voltage equal to $V_0$ is applied across inductor 44A with a polarity as shown in FIG. 7. Since inductors 44A and 44B are magnetically coupled, a voltage equal to $V_0$ is also applied across inductor 44B with polarity as shown in FIG. 7. The induced voltage across inductor 44B discharges capacitors 84 and 86 to zero volts prior to the turn on of switches 80 and 88, thereby eliminating the $\frac{1}{2}CV^2$ losses that otherwise would occur at turn on (see FIGS. 6M and 6N).

At time $t_5$, both switches 80 and 88 are turned on as shown in FIGS. 6C and 6D respectively. When the voltage across switches 80 and 88 is zero a voltage is applied across inductor 44B. Current is transferred from diode 54 to switches 80 and 88 and inductor 44B. By time $t_7$, diode 54 has completed its reverse recovery and is effectively an open circuit (FIG. 6E). Current at this time is flowing through switches 80,88 and inductor 44B.

As shown in FIGS. 6C and 6D, at time $t_8$, switch 80 turns off but switch 88 remains on. This maintains a constant current in inductor 44B until switch 88 turns off at time $t_9$. Capacitors 84 and 86 provide turn off snubbing for switches 80 and 88 respectively. When switch 88 turns off at time $t_9$, a voltage is supplied across inductor 44B equal to $V_0$. A voltage also equal to $V_0$ is applied across inductor 44A because of the previously discussed magnetic coupling. The voltage across inductor 44A discharges capacitors 50 and 52 in preparation for the next cycle wherein switches 40 and 46 are again turned on to repeat the operation.

As will be noted, during the time when switches 40 and 46 are on, current flows into the inductor 44A at end 98. Current flows out of inductor 44B from end 99 when switches 80 and 88 are on. This bi-directional current establishes automatic reset and bi-directional flux in the magnetic core of the inductor combination 44A,44B. The bi-directional flux also means that a smaller core can be used for a given inductance value.

FIG. 7 is an enlarged view of the inductor circuit combining inductors 44A and 44B.

While specific embodiments of the invention have been described and illustrated, it will be apparent to one skilled in the art that variations are possible. It is intended that such variations will be included within the scope of the invention as defined by the appended claims.

I claim:

1. A boost converter for a power factor correction circuit comprising:

input means for receiving a rectified AC signal;

output means;

a first controllable switch, a first inductor, and a second controllable switch connected in series across said input means;

a first controller for controlling the first switch to have a variable ON time;

a second controller for controlling the second switch to have a fixed ON time;

a first diode between said first switch and said output means;

a first capacitor in parallel with said first switch;

a second capacitor in parallel with said second switch;

a second diode across said first switch, said first inductor and said first diode; and a third diode across said second switch and said first inductor.

2. A boost converter as defined in claim 1, said first and second controllable switches being MOSFET devices having a gate, a drain, and a source.

3. A boost converter as defined in claim 2 wherein the duty cycle of said first MOSFET is determined by the maximum on-time of said second MOSFET.

4. A boost converter as defined in claim 3 wherein the first MOSFET is pulse width modulated.

5. A boost converter as defined in claim 2 wherein a second inductor is connected in series with the input means and the first controllable switch.

6. A boost converter as defined in claim 5, further comprising:

a third controllable switch, a third inductor, and a fourth controllable switch connected in parallel with said first switch, said first inductor, and said second switch;

a third controller means for controlling the third switch to have a variable ON time;

a fourth controller means for controlling the fourth switch to have a fixed ON time;

a third capacitor in parallel with said third switch;

a fourth capacitor in parallel with said fourth switch;

a fourth diode across said third switch, said third inductor and said first diode; and a fifth diode across said fourth switch and said third inductor.

7. A boost converter as defined in claim 6, said third and fourth switches being MOSFET devices.

8. A boost converter as defined in claim 7 wherein the duty cycle of said first MOSFET is determined by the maximum on-time of said second MOSFET, and the duty cycle of said third MOSFET is determined by the maximum on-time of said fourth MOSFET.

9. A boost converter as defined in claim 8 wherein the first and third MOSFETs are pulse width modulated.

10. A boost circuit as defined in claim 6 wherein said first inductor and said third inductor are magnetically coupled.

11. In a power supply for telecommunications equipment a power factor correction circuit having a boost converter, said boost converter comprising:

input means for receiving a rectified AC voltage:

output means;

first and second switch means serially connected to opposite ends of a first inductance means, the combination being connected across said input means;

a first capacitor shunting said second switch means;

a second capacitor shunting said second first switch means;

a first controller means for controlling the first switch means to have a variable ON time; and a second controller means for controlling the second switch means to have a fixed ON time such that the respective on-time of each switch means is adjusted to generate a boosted DC output voltage.

12. A boost converter as defined in claim 11 wherein said first and second switch means are MOSFET devices.

13. A boost converter as defined in claim 11, having a first clamping diode in parallel with said first switch means and inductance means and a second clamping diode in parallel with said second switch means and said inductance means.

14. A boost converter as defined in claim 13 wherein a second inductance means is connected in series with the input means and the first switch means.

15. A boost converter as defined in claim 14 wherein the DC voltage generated at the output is regulated by the on-time of said first switch means.

16. A boost converter as defined in claim 13 wherein the duty cycle of said first switch means is determined by the maximum on-time of said second switch means.

17. A method of generating a boosted DC voltage from a rectified AC voltage comprising the steps of:

supplying the rectified AC voltage to a boost converter having a boost inductor, a boost diode; and first and second independently controllable switch means serially connected to opposing ends of an inductance means, each of the switch means having a shunt capacitor;

controlling the first switch means to have a variable ON time;

controlling the second switch means to have a fixed ON time;

and controlling the on and off relationship of each of said first and second switch means as a function of the frequency of the rectified AC input to minimize the reverse recovery current of said boost diode.

18. The method of claim 17 wherein the on and off relationship of the controllable switch means is selected to reduce switching losses in respective switch means.

* * * * *